(12) United States Patent
Elser

(10) Patent No.: US 8,604,660 B2
(45) Date of Patent: Dec. 10, 2013

(54) STATOR OF AN ELECTRIC MACHINE

(75) Inventor: Armin Elser, Alfdorf-Brech (DE)

(73) Assignee: Robert Bosch GmbH, Stuttgart (DE)

( * ) Notice: Subject to any disclaimer, the term of this patent is extended or adjusted under 35 U.S.C. 154(b) by 511 days.

(21) Appl. No.: 12/673,917

(22) PCT Filed: Aug. 11, 2008

(86) PCT No.: PCT/EP2008/060517
§ 371 (c)(1),
(2), (4) Date: May 17, 2011

(87) PCT Pub. No.: WO2009/024494
PCT Pub. Date: Feb. 26, 2009

(65) Prior Publication Data
US 2011/0210640 A1    Sep. 1, 2011

(30) Foreign Application Priority Data

Aug. 17, 2007 (DE) .......................... 10 2007 038 988

(51) Int. Cl.
| H02K 1/00 | (2006.01) |
| H02K 3/00 | (2006.01) |
| H02K 19/26 | (2006.01) |
| H02K 21/00 | (2006.01) |
| H02K 23/40 | (2006.01) |
| H02K 3/30 | (2006.01) |

(52) U.S. Cl.
CPC ....................................... *H02K 3/30* (2013.01)
USPC ............. 310/194; 310/43; 310/214; 310/215; 310/216.105

(58) Field of Classification Search
CPC .......... H02K 3/325; H02K 3/522; H02K 3/30
USPC ............. 310/43, 198, 214, 215, 216.105, 194
See application file for complete search history.

(56) References Cited

U.S. PATENT DOCUMENTS

| 3,339,097 A | | 8/1967 | Dunn |
| 4,633,114 A | * | 12/1986 | Reynolds ...................... 310/194 |
| 4,874,977 A | * | 10/1989 | Safranek ....................... 310/269 |
| 6,177,741 B1 | | 1/2001 | Lutkenhaus |
| 7,084,543 B2 | * | 8/2006 | Aulanko et al. .............. 310/214 |
| 7,122,934 B2 | * | 10/2006 | Yamamoto et al. .... 310/216.105 |
| 2003/0111914 A1 | | 6/2003 | Miyagawa |
| 2005/0146232 A1 | * | 7/2005 | Yamamoto et al. ............. 310/43 |
| 2011/0210640 A1 | * | 9/2011 | Elser ............................. 310/208 |

FOREIGN PATENT DOCUMENTS

| DE | 3505092 | 8/1986 |
| DE | 10035540 | 10/2001 |
| EP | 0817282 | 1/1998 |
| EP | 0891030 | 1/1999 |
| FR | 2814295 | 3/2002 |
| GB | 1512894 | 6/1978 |
| JP | 2000341897 | 12/2000 |

OTHER PUBLICATIONS

International Search Report for PCT/EP2008/060517, Jan. 14, 2009, pp. 1-3.

* cited by examiner

*Primary Examiner* — John K Kim
(74) *Attorney, Agent, or Firm* — Kenyon & Kenyon LLP

(57) ABSTRACT

The invention relates to a stator of an electrical machine, with at least one stator tooth and a coil wound outside of the stator, which coil has been pushed onto the stator tooth substantially radially. It is provided that the coil (4) is held radially on the stator tooth (2) by means of at least one form-fitting connection (13). Furthermore, the invention relates to an electrical machine with such a stator (1).

12 Claims, 3 Drawing Sheets

STATOR OF AN ELECTRIC MACHINE

FIELD OF INVENTION

The present invention relates to a stator of an electric machine.

BACKGROUND INFORMATION

Stators of electric machines in principle may be wound in two ways. The windings are applied one after the other onto insulated individual stator teeth, or, alternatively, coils wound outside of the stator are fit onto teeth of the stator. If the coils are wound directly onto the stator teeth, their windings have to be prevented from slipping off the stator teeth. This is achieved, for example, by relying on the situation that the stator teeth have a greater cross section in their head region than in their root region in order thus to fix the coil windings on the tooth. This method considerably limits the achievable copper filling factor. That is, it is not possible to insert as many windings as are possibly required in order to reach a certain magnetic flux or a certain magnetic field density. In another development of this manufacturing method, the coil windings are wound onto an individual tooth that is already insulated. The stator is then assembled from the wound individual teeth, for example, welded together on the external diameter. This manufacturing method is very painstaking and susceptible to production errors. Reference EP 0 891 030 A2 describes providing coils of different geometries for stator teeth without enlargement of the cross section on the head side (having essentially parallel tooth walls), coils of the one geometry being mounted on the one tooth, and coils of the other geometry being mounted on the subsequent tooth, after these coils are wound outside of the stator, are pressed into shape and kept in shape by a thermoplastic synthetic resin prior to being put into the stator. This described situation involves a very complicated and error-prone coil winding process, because the required coil geometry must be met very precisely, otherwise mounting onto the stator teeth is not possible or is possible only by impairing the coil geometry, which in the original case ends in the destruction of the coil. This described situation appears to require that coils of different geometries must be used.

SUMMARY

Embodiments of the present invention provide a stator of an electric machine which, having coils wound outside of the stator, achieves a maximum degree of copper filling and, thus, a maximum magnetic flux density, thus ensuring a simple and cost-effective manufacture combined with a very high operational reliability. Embodiments of the present invention provide a stator of an electric machine having at least one stator tooth and a coil wound outside of the stator, which is slid onto the stator tooth essentially radially. Embodiments of the present invention have a provision for the coil to be retained radially on the stator sooth by at least one positive engagement. The coil wound outside of the stator, which is mounted onto the stator tooth as a prefabricated component, is radially retained on the stator tooth by at least one positive engagement. In embodiments, the coil wound outside of the stator is radially retained on the stator tooth by at least one positive engagement in such a way that it cannot slide off the stator tooth onto which it was slid.

Reference EP 0 891 030 A2 describes coils, which respectively have two different geometries, which are wedged against each other in the mounting process. In that situation, the coils retain each other, which places a high demand on the precision of the manufacture of the coil geometry as well as on the care of mounting the coils in the stator. The failure of a coil in this case entails practically with necessity the failure of the adjacent coil as well. In embodiments of the present invention, by contrast, the coil is retained on the stator tooth itself by a positive engagement, and not by leaning against an adjacent coil. The coil itself is merely slid onto the stator tooth.

In embodiments of the present invention, the coil is wound onto a bobbin. The positive engagement is formed between the bobbin and the stator. Since the coils in any event must be insulated against the stator teeth, which, e.g., appears to have been done by inserting insulating paper, one can use a bobbin having a geometry such that it may be slid onto the stator tooth. The bobbin supports the actual coil, that is, the copper winding, and acts at the same time as its insulator with respect to the stator tooth. In embodiments, the positive engagement between the bobbin and the stator is developed in such a way that the coil as such may be wound in a manner, e.g., known from the related art without regard to special geometric requirements resulting from the desired positive engagement. In embodiments, the positive engagement is effected via the bobbin, not via the form of the winding.

In embodiments of the present invention, on its tooth face in the head region, the stator tooth has an undercut as part of the positive engagement. In embodiments, on its tooth face, which may be developed peripherally or in the form of multiple tooth sides, the stator tooth consequently has at least one recess in the form of an undercut. This undercut is a functional part of the positive engagement. In embodiments, the undercut is developed in such a way, e.g., that an axially continuous undercut or notch exist in the head region on the tooth face.

In embodiments of the present invention, the bobbin has at least one latch entering into the undercut. This latch belongs to the positive engagement and allows for it to be self-actively established by merely sliding the bobbin on. In embodiments, the latch and the undercut are arranged in such a way that they necessarily engage into each other in the intended final installation position when the bobbin is slid onto the stator tooth. The latch is developed flexibly on the bobbin such that it is pressed back by the tooth face in the direction of the coil when sliding the bobbin onto the stator tooth, so as to emerge again when reaching the undercut and snap into the undercut. This allows for a self-acting, secure and inexpensive manufacture of the positive engagement for fastening the bobbin on the stator tooth.

In embodiments of the present invention, the bobbin is retained in its root area on the stator by at least one additional positive engagement. By developing this at least one further positive engagement, the fastening of the bobbin on the stator tooth may be improved. This accomplishes, for example, that the bobbin is also retained in its root area and that thus there exist different retaining points across its extension. In this manner, retaining forces are applied over the entire extension of the bobbin, which act against the bobbin sliding off the stator tooth. Undesired inherent vibrations and the like may thus be effectively prevented and the stability of the fastening may be increased markedly.

In embodiments of the present invention, for forming the additional positive engagement, the bobbin has a snap-in hook, which latches into an accommodation of the stator. In embodiments, a snap-in hook that latches into an accommodation presents a self-acting, simple and secure option for developing a positive engagement. In embodiments, the snap-in hook is formed, e.g., as an elastic part in one piece with the bobbin, in particular manufactured from the same plastic material in the manufacturing process of the bobbin as such. In embodiments, to form the positive engagement, an accommodation is provided on the stator, which cooperates with the snap-in hook, e.g., allowing it to engage in the final installation position of the bobbin.

In embodiments of the present invention, the accommodation is developed on an interconnection ring of the stator. In embodiments, stators have interconnection rings that are used for interconnecting the individual coils among one another or with the necessary electrical terminals. In embodiments, these interconnection rings are normally made of an insulating material which allows for the electrically conductive contacts and/or coil wires to be applied directly without having to provide additional insulations. In embodiments, one may easily situate the accommodation for the snap-in hook on such an interconnection ring, e.g., by manufacturing the accommodation along with the interconnection ring from a plastic material, for example by extrusion or integral formation, or as a recess in a region of the interconnection ring.

In embodiments of the present invention, the accommodation is takes the form of an eyelet. This is intended to mean that the accommodation slightly protrudes over regions of the stator and/or the interconnection ring, e.g., in the radial direction, and in so doing forms an eyelet approximately in the shape of an upside-down "U" attached on its open side to the interconnection ring, i.e., a recess that is embraced by a circumferential closed outer contour. The eyelet in this case acts to embrace and support the snap-in hook, the snap-in hook in the process penetrating the eyelet and, having penetrated the eyelet, engaging on its outer contour, e.g., on the backside.

In embodiments of the present invention, an electric machine having a stator is provided. Machines equipped with such a stator according to one or more embodiments of the present invention have a particularly high efficiency because the stator allows for the application of a high magnetic flux density. At the same time, for example, these machines may be manufactured cost-effectively and are very reliable because the stator windings are securely fastened on the stator teeth, thereby reducing failures due to coil damage. In embodiments, when service is required, the coils can be readily detached and replaced with replacement parts by releasing the positive engagement, e.g., the snap-in hook from the accommodation and the latch from the undercut.

Additional advantageous specific embodiments follow from the dependent claims and from combinations of the same.

DETAILED DESCRIPTION

Figure 1:
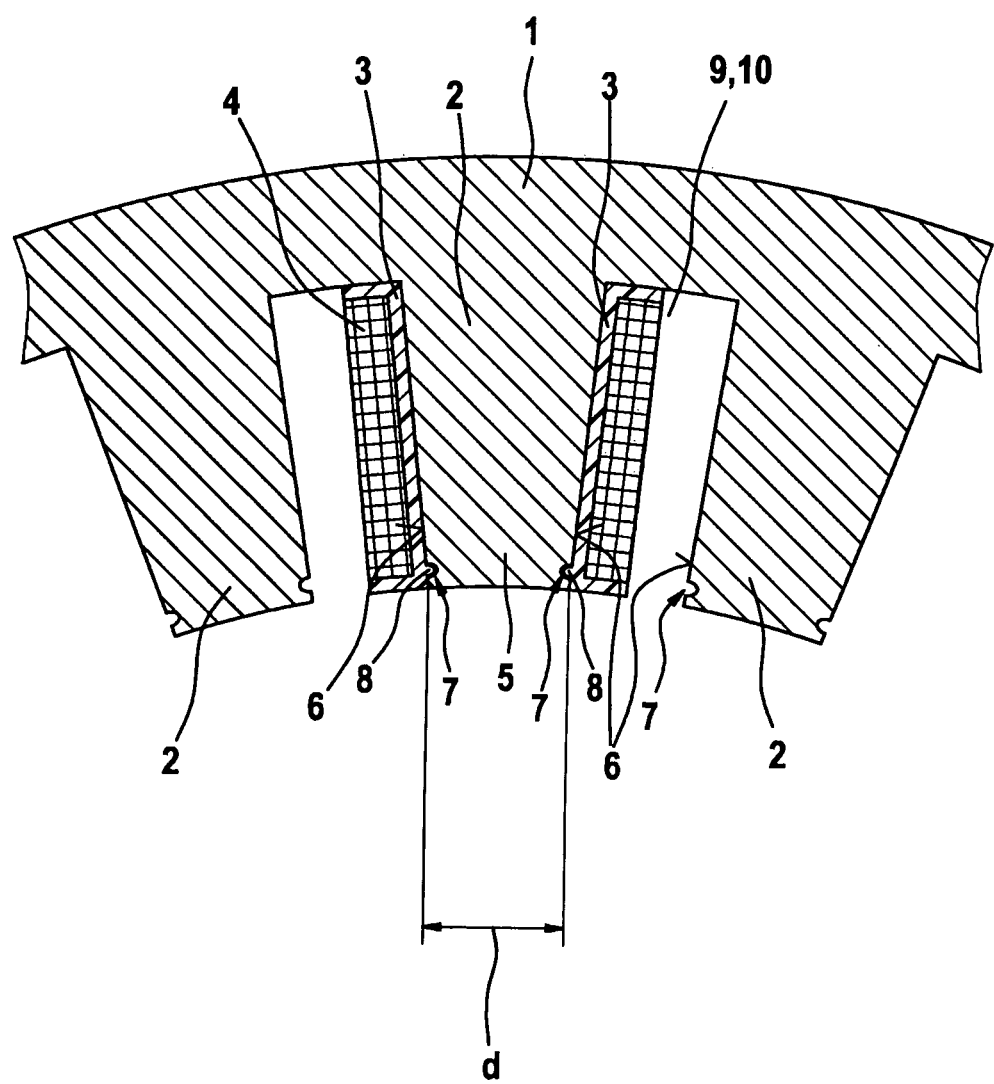
FIG. 1 shows a stator segment having wound stator teeth in a cross-sectional view according to an embodiment.

FIG. 1 shows a cross-sectional view of a segment of a hollow stator 1 of an electric machine (not shown) of an example embodiment of the present invention. Stator 1 has stator teeth 2 on its inner side, onto which a bobbin 3 is slid entirely, its longitudinal orientation being essentially identical to that of stator tooth 2. Bobbin 3 bears a coil 4. In an embodiment, bobbin 3 bears a coil 4 wound outside of the stator onto bobbin 3. In an embodiment, bobbin 3 is formed so as to embrace stator tooth 2 entirely on all sides. In an embodiment, it is developed in the form of bobbins known from other areas of the art, with the provision that its inner geometry is adapted to the geometry of stator tooth 2 in such a way that it may be slid entirely onto stator tooth 2. In am embodiment, in its head region 5, stator tooth 2 has on opposite tooth faces 6 respectively an undercut 7 into which a latch 8 engages, which is formed on the inner side on bobbin 3, in such a way that it reaches inward across the relevant inner diameter d of bobbin 3 in head region 5 of stator tooth 2. When sliding on bobbin 3, latch 8 engages in undercut 7 on stator tooth 2 and fastens the bobbin in the shown final mounting position, in such a way that bobbin 3 cannot slide off stator tooth 2 against the direction of insertion. In an embodiment, forming coil 4 on a bobbin 3, which is slid onto stator tooth 2 after winding coil 4, offers the possibility of winding bobbin 3 to the maximum extent such that neighboring coils 4 on neighboring stator teeth 2 may be developed in such a way that the available winding space 9, which is to be regarded in the broadest sense as stator tooth interval 10, may be filled entirely with coils 4 such that it becomes possible to achieve a high electromagnetic field density on stator 1. Thus, in embodiments of the present invention, it is possible to use stator teeth 2 having a cross section tapering toward their head region 5, which increases the stator tooth interval 10 between stator teeth 2 and thus allows for a larger coil 4 having more windings to be installed, which thus allows for the magnetic field density to be increased.

Figure 2:
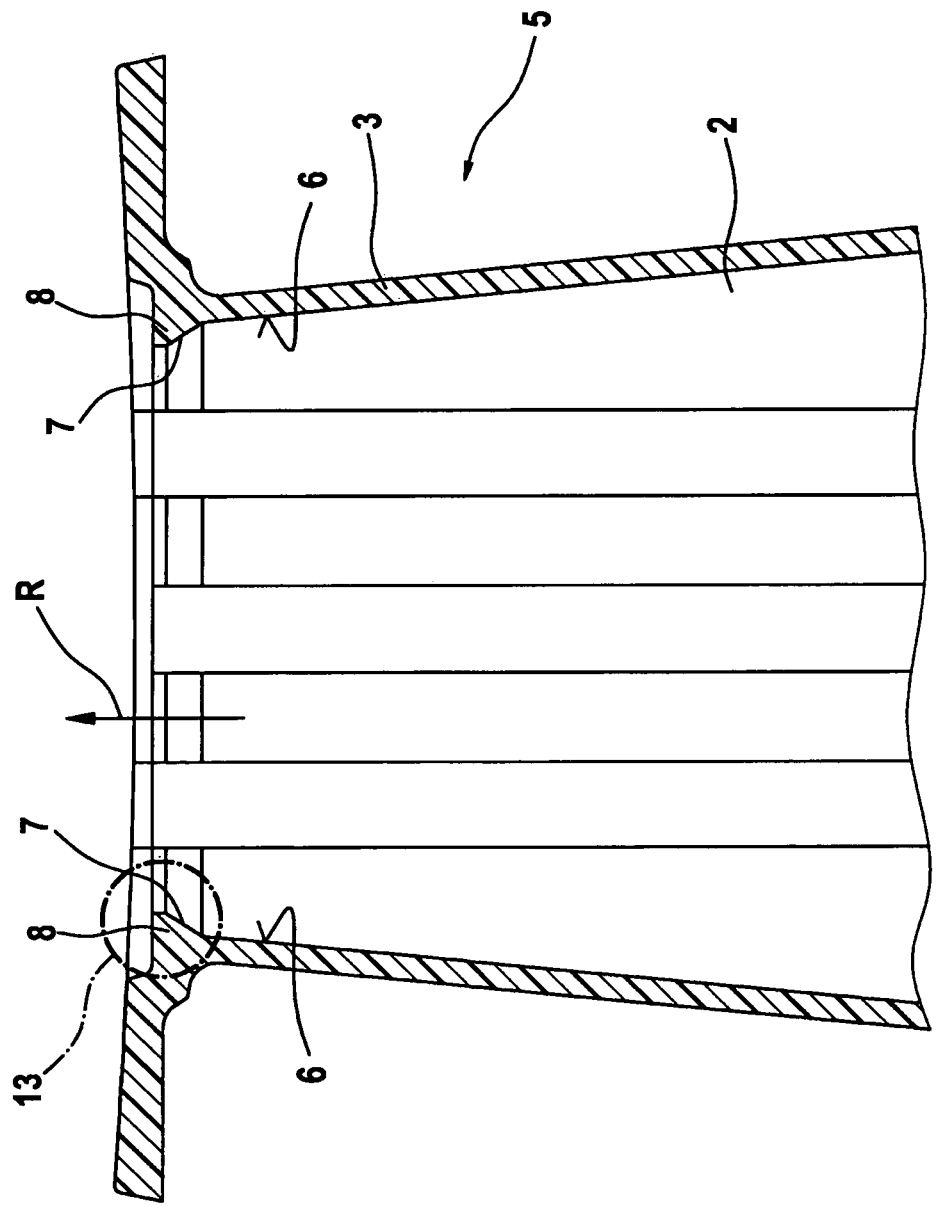
FIG. 2 shows a cross-sectional view of a head region of a stator tooth having an unwound bobbin according to an embodiment.

FIG. 2 shows head region 5 of stator tooth 2 having an installed bobbin 3, which is not wound, that is, which has no coil winding. Undercut 7 for accommodating latch 8 formed in the head region on bobbin 3 is situated in head region 5 of stator tooth 2, e.g., on tooth face 6 of stator tooth 2. In the installed state embodiment shown in the figure, latch 8 and undercut 7 yield a positive engagement 13, which prevents bobbin 3 from sliding radially off stator tooth 2 in direction R.

Figure 3:
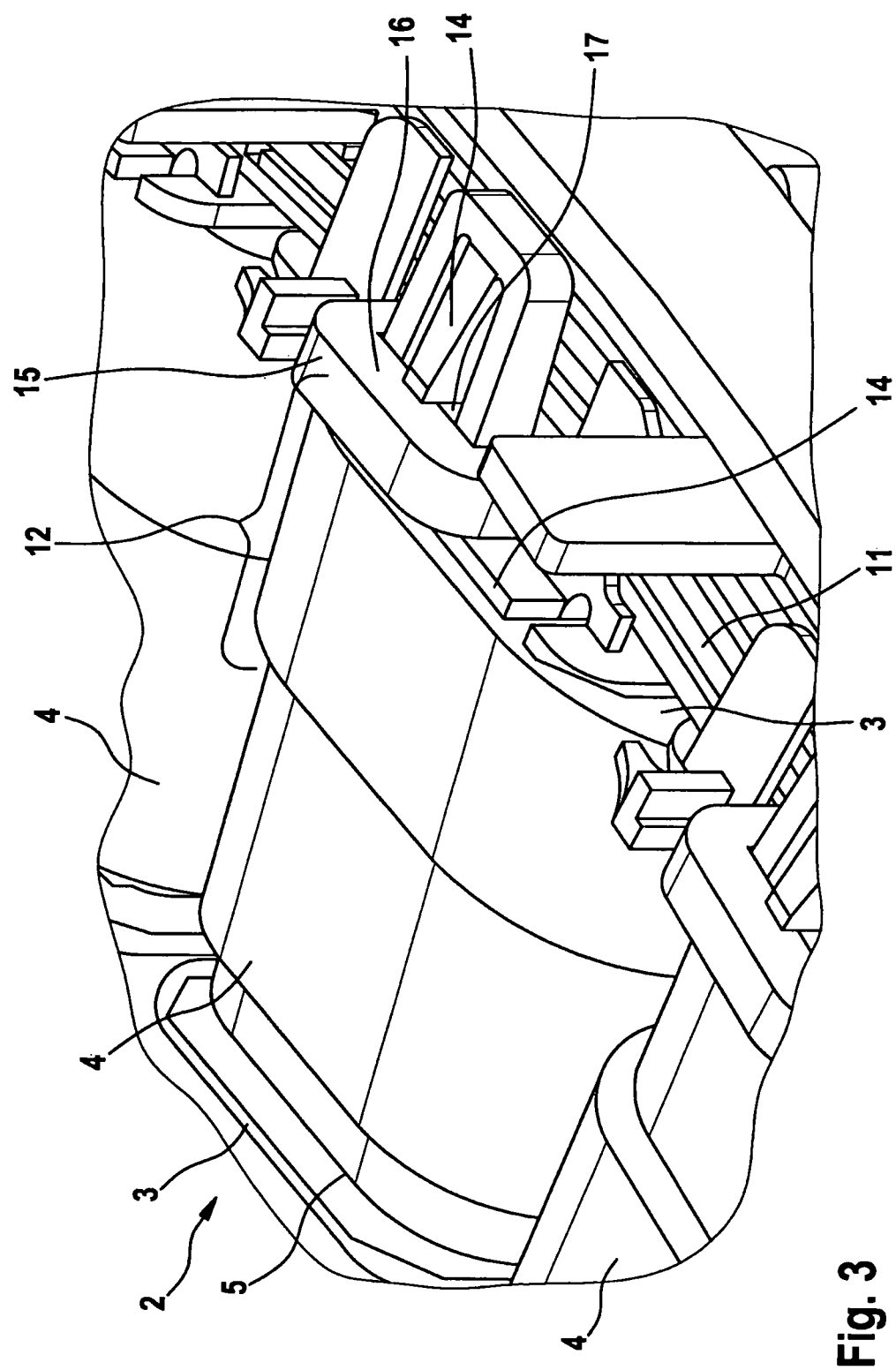
FIG. 3 shows a sectional perspective top view of a stator having a snap-in hook formed on an interconnection ring according to an embodiment.

FIG. 3 shows a sectional perspective top view of the same stator 1 having an interconnection ring 11 situated on the peripheral side on stator 1 for electrically interconnecting coils 4 and having bobbins 3 wound with coils 4 and slid onto stator teeth 2. In a root region 12 of bobbin 3, which is adjacent to interconnection ring 11 and at a distance from head region 5, a snap-in hook 14 is developed on bobbin 3 so as to form a positive engagement 13 between bobbin 3 and interconnection ring 11 situated on stator 1, which snap-in hook 14 extends out in the radial direction on the outer peripheral side of a base plate 14 of bobbin 3. In the installed state embodiment shown, snap-in hook 14 reaches through an accommodation 15 situated on interconnection ring 11 for accommodating snap-in hook 14, which is developed for example in the form of an upside-down U and forms an eyelet 17 together with interconnection ring 11, which allows for snap-in hook 14 to reach through; in a final installation position, that is, in the final position of the process of reaching through, snap-in hook 14 engaging behind accommodation 15 in a support region 16 of accommodation 15 for snap-in hook 14, for example on account of an immanent spring tension as may be achieved for example by a choice and form of material. This prevents bobbin 3 from being able to slide off again from stator tooth 2 in the radial direction, that is, counter to the previously described direction in which it is slid onto stator tooth 2. In an embodiment, snap-in hook 14 and accommodation 15 form a positive engagement for radially retaining bobbin 3 on stator tooth 2. According to the present invention, such a positive engagement 13 is assigned to each bobbin 3 of stator 1.

What is claimed is:

1. A stator of an electric machine, comprising:
   at least one stator tooth;
   a coil wound outside of the stator, which is slid onto the stator tooth essentially radially; and
   a bobbin;
   wherein the coil is radially retained on the stator tooth by at least one positive engagement;
   wherein the coil is wound on the bobbin and the at least one positive engagement is formed between the bobbin and the stator; and
   wherein the bobbin in its root region on an end opposite to a head region of the bobbin is retained on the stator by at least one additional positive engagement.

2. The stator as recited in claim 1, wherein the stator tooth has on its tooth face in a head region of the stator tooth at least one undercut as part of the positive engagement.

3. The stator as recited in claim 2, wherein the bobbin has at least one latch entering into the undercut.

4. The stator as recited in claim 1, wherein the bobbin, for the purpose of forming the additional positive engagement, has a snap-in hook, which engages with an accommodation of the stator.

5. A stator of an electric machine, comprising:
   at least one stator tooth; and
   a coil wound outside of the stator, which is slid onto the stator tooth essentially radially; and
   a bobbin;
   wherein the coil is radially retained on the stator tooth by at least one positive engagement;
   wherein the coil is wound on the bobbin and the at least one positive engagement is formed between the bobbin and the stator;
   wherein the bobbin, for the purpose of forming another positive engagement, has a snap-in hook, which engages with an accommodation of the stator;
   wherein the accommodation is formed on an interconnection ring of the stator.

6. A stator of an electric machine, comprising:
   at least one stator tooth; and
   a coil wound outside of the stator, which is slid onto the stator tooth essentially radially; and
   a bobbin;
   wherein the coil is radially retained on the stator tooth by at least one positive engagement;
   wherein the coil is wound on the bobbin and the at least one positive engagement is formed between the bobbin and the stator;
   wherein the bobbin, for the purpose of forming another positive engagement, has a snap-in hook, which engages with an accommodation of the stator;
   wherein the accommodation is formed in the shape of an eyelet.

7. An electric machine, comprising:
   a stator, the stator having:
      at least one stator tooth; and
      a coil wound outside of the stator, which is slid onto the stator tooth essentially radially, and wherein the coil is radially retained on the stator tooth by at least one positive engagement;
   wherein in the stator, the coil is wound on a bobbin and the at least one positive engagement is formed between the bobbin and the stator;
   wherein in the stator, the bobbin in its root region on an end opposite a head region of the bobbin is retained on the stator by at least one additional positive engagement.

8. The electric machine as recited in claim 7, wherein in the stator, the stator tooth has on its tooth face in a head region of the stator tooth at least one undercut as part of the positive engagement.

9. The electric machine as recited in claim 8, wherein in the stator, the bobbin has at least one latch entering into the undercut.

10. The electric machine as recited in claim 7, wherein the bobbin, for the purpose of forming the additional positive engagement, has a snap-in hook, which engages with an accommodation of the stator.

11. An electric machine, comprising:
    a stator, the stator having:
       at least one stator tooth; and
       a coil wound outside of the stator, which is slid onto the stator tooth essentially radially, and wherein the coil is radially retained on the stator tooth by at least one positive engagement;
    wherein in the stator, the coil is wound on a bobbin and the at least one positive engagement is formed between the bobbin and the stator;
    wherein the bobbin, for the purpose of forming another positive engagement, has a snap-in hook, which engages with an accommodation of the stator; and
    wherein the accommodation is formed on an interconnection ring of the stator.

12. An electric machine, comprising:
    a stator, the stator having:
       at least one stator tooth; and
       a coil wound outside of the stator, which is slid onto the stator tooth essentially radially, and wherein the coil is radially retained on the stator tooth by at least one positive engagement;
    wherein in the stator, the coil is wound on a bobbin and the at least one positive engagement is formed between the bobbin and the stator;
    wherein the bobbin, for the purpose of forming another positive engagement, has a snap-in hook, which engages with an accommodation of the stator; and
    wherein the accommodation is formed in the shape of an eyelet.

* * * * *

UNITED STATES PATENT AND TRADEMARK OFFICE
CERTIFICATE OF CORRECTION

PATENT NO. : 8,604,660 B2  Page 1 of 1
APPLICATION NO. : 12/673917
DATED : December 10, 2013
INVENTOR(S) : Armin Elser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this
Twenty-second Day of September, 2015

Michelle K. Lee
*Director of the United States Patent and Trademark Office*